UNITED STATES PATENT OFFICE.

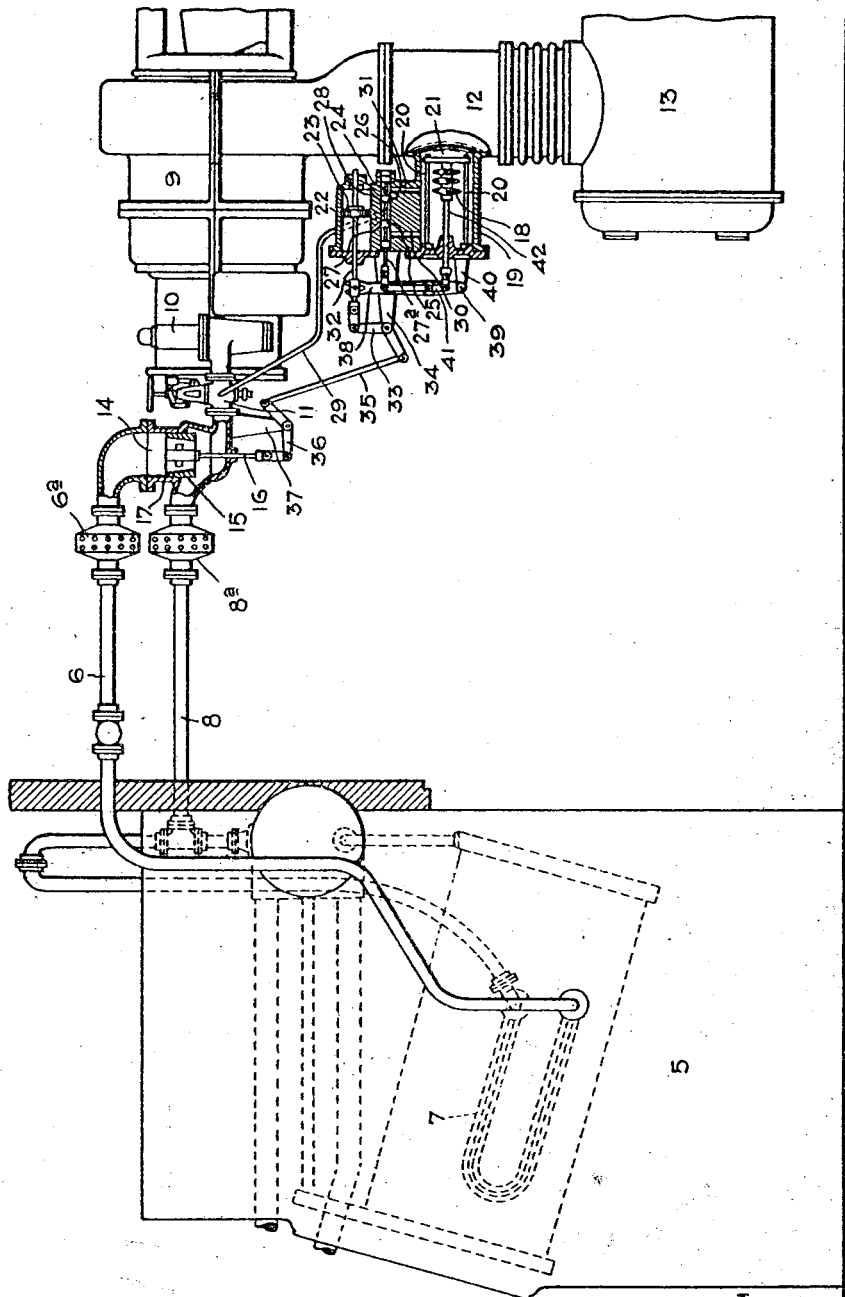

RICHARD H. RICE, OF LYNN, MASSACHUSETTS, ASSIGNOR TO GENERAL ELECTRIC COMPANY, A CORPORATION OF NEW YORK.

ELASTIC-FLUID TURBINE.

1,197,666.   Specification of Letters Patent.   Patented Sept. 12, 1916.

Application filed February 14, 1916. Serial No. 78,153.

*To all whom it may concern:*

Be it known that I, RICHARD H. RICE, a citizen of the United States, residing at Lynn, county of Essex, State of Massachusetts, have invented certain new and useful Improvements in Elastic-Fluid Turbines, of which the following is a specification.

The present invention relates to elastic fluid turbines such as are operated primarily by a superheated elastic fluid, as superheated steam. With such machines it may happen under certain conditions of load, as at light load, that the elastic fluid in passing through the machine will not have all the available energy abstracted from it and hence will leave the machine at a temperature above that represented by the pressure of the exhaust; *i. e.*, in a superheated condition. This means a loss of energy, and the object of the present invention is to provide an arrangement for preventing such losses.

In carrying out my invention I provide in connection with the conduit which conveys the superheated elastic fluid into the turbine a suitable means controlled by the temperature of the exhaust for admitting to it elastic fluid of a lower temperature, as dry saturated elastic fluid, whereby the initial temperature, or degree of superheat of the elastic fluid entering the turbine may be so reduced that the exhaust will not leave the machine in a superheated condition, or at best with only a few degrees of superheat.

For a consideration of what I believe to be novel and my invention, attention is directed to the accompanying specification and the claims appended thereto.

The accompanying drawing is a view of a diagrammatic nature and partly in section of an embodiment of my invention.

Referring to the drawing, 5 indicates an elastic fluid boiler, as a steam boiler, which may be of any suitable or desired form. Its specific structure forms no part of the present invention.

6 indicates a conduit for conveying superheated elastic fluid from the superheating coils 7 of the boiler to the turbine, and 8 indicates a conduit for conveying elastic fluid of a lower temperature, as dry saturated elastic fluid from the boiler.

$6^a$ and $8^a$ are strainers arranged in pipes 6 and 8 respectively.

9 indicates an elastic fluid turbine, for example, one of the impulse type, provided with a throttle or other valve means 10 for controlling the admission of elastic fluid to it and an emergency cut-off valve 11. These valves may be of any suitable structure and may be under the control of a suitable governor or governors as desired.

12 indicates the exhaust conduit leading to a condenser 13.

The conduit 8 connects with conduit 6 at a point in advance of the valves 10 and 11 and the admission of elastic fluid from it to conduit 6 is controlled by a valve 14. In the present instance the valve 14 is shown as comprising an annular member 15 having a stem 16 and arranged to slide in a casing 17. Its position has no effect on the flow of fluid through conduit 6, as such fluid flows through the center of it. According to its position, however, it admits more or less elastic fluid from conduit 8 to the valve casing 17, which fluid will mix with that flowing through conduit 6. The valve 14 is placed either directly or indirectly under the control of a thermostatic device arranged in the exhaust conduit 12 so that its position is determined by the temperature of the exhaust.

18 indicates a thermostat supported in a casing 19 by means of the bolts 20. The casing 19 is in open communication at 21 with the exhaust conduit 12 so that the thermostat is subjected to the temperature of the exhaust. The thermostat may control the valve 14 either electrically or mechanically. In the present instance I have shown it as controlling the valve 14 through a fluid actuated motor.

22 indicates the cylinder of the motor, 23 the piston, and 24 the pilot valve mechanism comprising the two valves 25 and 26 connected to valve stem $27^a$. When in normal position the valves 25 and 26 cover openings 27 and 28 leading to the cylinder 22 on opposite sides of the piston 23. The space between valves 25 and 26 is connected to a suitable source of fluid pressure, as the elastic fluid conduit leading to the turbine, by a pipe 29 and the spaces on the outside of the valves are connected by openings 30 and 31 to casing 19.

32 indicates the piston rod of the fluid actuated motor. It is connected to the valve stem 16 of valve 14 through a lever 33 pivoted on a support 34, a rod 35, and a lever 36 pivoted on a support 37. Also connected with the piston rod 32 is one end of an arm 38 pivoted at 39 to a bracket 40. On the arm 38 is pivoted a lever 41, one end of which connects with the stem 27ª of the pilot valve mechanism and the other with a rod 42 which is fixed to and is moved by the thermostat 18.

The operation is as follows: As the valve 14 is shown in the drawing it is in such a position that a certain amount of dry saturated elastic fluid from the pipe 8 is being mixed with the superheated elastic fluid coming from the conduit 6. It will be understood that the total amount of elastic fluid admitted to the turbine is controlled by the throttle or other valve means 10. If, now, owing to any change in operating conditions, the temperature of the exhaust in the conduit 12 increases, the thermostat 18 will expand and through rod 42 will turn lever 41 on its pivot so as to move the pilot valves 25 and 26 toward the right. This will connect the right-hand end of cylinder 22 of the fluid actuated motor with the pipe 29 by way of opening 28, and the left-hand end with the casing 19 by way of openings 27 and 30. Elastic fluid will thus be admitted upon the right-hand side of piston 23 forcing it toward the left thus turning lever 33 on its pivot and through rod 35 and lever 36 moving the valve 15 upward. This will then admit more saturated elastic fluid to be mingled with the superheated fluid coming from the conduit 6, and will thus reduce the initial temperature of the elastic fluid entering the turbine, which will mean that its exhaust temperature will likewise be reduced. When the piston 23 moves to the left as just described, the arm 38 is moved on its pivot 39 in an anti-clockwise direction. This will carry with it the lever 41 which is pivoted on the arm, which lever will pivot on the end of the rod 42 which is fixed to the thermostat and move the pilot valves back to a position where they cover the openings 27 and 28. In other words, this acts in the manner of the usual follow-up device. When the temperature of the exhaust becomes lower the thermostat will be contracted, and in the manner already explained, will cause the valve 15 to close slightly thereby cutting down the amount of saturated elastic fluid coming from the conduit 8. The apparatus will preferably be set to maintain a temperature in the exhaust of say 5 or 6° of superheat so as to give a suitable working range for it. The mechanism must also be so arranged that the valve 15 will never open to such an extent that the flow of superheated elastic fluid will cease, because in this case it would be liable to burn out the superheating coils of the boiler. As a general proposition, it may be stated that there should be at least a flow of 25% from the conduit which conveys the superheated elastic fluid in order to keep the tubes which do the superheating from burning out.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is;

1. The combination with a fluid turbine, of a conduit for conveying superheated elastic fluid thereto, and means controlled by the temperature of the exhaust from the turbine for admitting fluid of a lower temperature to said conduit.

2. The combination with an elastic fluid turbine, of a source of superheated elastic fluid, a conduit for conveying elastic fluid from it to the turbine, a source of elastic fluid of a lower temperature, a second conduit for conveying elastic fluid from it to the first named conduit, a valve in the second conduit, and means controlled by the temperature of the exhaust from the turbine for controlling said valve.

3. The combination with an elastic fluid turbine, of a source of superheated elastic fluid, a conduit for conveying elastic fluid from it to the turbine, a regulating valve in such conduit, a source of elastic fluid of a lower temperature, a second conduit for conveying elastic fluid from it to the first named conduit, said second conduit connecting with the first named conduit in advance of the regulating valve, a valve in the second conduit, a thermostat which is subjected to the temperature of the exhaust from the turbine, and means controlled by the thermostat for positioning the valve in the second conduit.

4. The combination with an elastic fluid turbine, of a source of superheated elastic fluid, a conduit for conveying elastic fluid from it to the turbine, a regulating valve in such conduit, a source of elastic fluid of a lower temperature, a second conduit for conveying elastic fluid from it to the first named conduit, said second conduit connecting with the first named conduit in advance of the regulating valve, a valve in the second conduit, a thermostat which is subjected to the temperature of the exhaust from the turbine, and a fluid motor controlled by the thermostat connected to the valve in the second conduit.

5. The combination with a steam turbine, of a steam boiler, a conduit for conveying superheated steam from the boiler to the turbine, a conduit for conveying saturated steam from the boiler to the first named conduit for reducing the temperature of the steam flowing therein, and means controlled by the temperature of the exhaust steam of the turbine for regulating the admission of saturated steam from the first named conduit to the second.

In witness whereof, I have hereunto set my hand this eleventh day of February, 1916.

RICHARD H. RICE.